United States Patent
Koizumi et al.

(10) Patent No.: US 11,181,635 B2
(45) Date of Patent: Nov. 23, 2021

(54) ULTRASONIC DISTANCE DETECTOR

(71) Applicant: DENSO CORPORATION, Kariya (JP)

(72) Inventors: Takuya Koizumi, Kariya (JP);
Hironori Iwamiya, Kariya (JP);
Akihiro Konno, Kariya (JP)

(73) Assignee: DENSO CORPORATION, Kariya (JP)

( * ) Notice: Subject to any disclaimer, the term of this patent is extended or adjusted under 35 U.S.C. 154(b) by 26 days.

(21) Appl. No.: 16/785,815

(22) Filed: Feb. 10, 2020

(65) Prior Publication Data

US 2020/0256985 A1 Aug. 13, 2020

(30) Foreign Application Priority Data

Feb. 12, 2019 (JP) .............................. JP2019-022646

(51) Int. Cl.
*G01S 15/08* (2006.01)

(52) U.S. Cl.
CPC ................... *G01S 15/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,054,100 | B1 * | 11/2011 | Liao | H04L 25/0278 326/30 |
| 2002/0090026 | A1 * | 7/2002 | Ashley | H04L 5/1423 375/219 |
| 2017/0254900 | A1 * | 9/2017 | Curtis | G01S 7/523 |
| 2019/0212444 | A1 * | 7/2019 | Ogawa | G01S 15/931 |

FOREIGN PATENT DOCUMENTS

| | | |
|---|---|---|
| JP | H04-372213 A | 12/1992 |
| JP | 2005-142717 A | 6/2005 |
| JP | 2006-145403 A | 6/2006 |
| JP | 2018-119808 A | 8/2018 |

OTHER PUBLICATIONS

Cornwall, Joe; Myth vs Reality-Putting Cat5E-Based A/V Structured Wiring In Its Place; Oct. 6, 2008; Audioholics; pp. 1-4 (taken from the following URL: https://www.audioholics.com/audio-video-cables/myth-vs-reality-2013-putting-cat5e-based-a-v-structured-wiring-in-its-place) (Year: 2008).*
U.S. Appl. No. 16/920,886, filed Jul. 6, 2020, Konno et al.
U.S. Appl. No. 16/921,141, filed Jul. 6, 2020, Kurokawa et al.

* cited by examiner

*Primary Examiner* — Nabil H Syed
*Assistant Examiner* — Cal J Eustaquio
(74) *Attorney, Agent, or Firm* — Posz Law Group, PLC

(57) ABSTRACT

A liquid level detector has an ultrasonic sensor connected thereto by two signal lines. When a drive signal is output from a drive circuit, the drive signal is output via an impedance matching circuit, thereby transmission and reception signals on the signal lines flow as complementary level signals. A receiver circuit obtains an amplified signal by amplifying the transmission and reception signals with a differential amplifier circuit, and by cutting a same phase noise signal.

6 Claims, 3 Drawing Sheets

ULTRASONIC DISTANCE DETECTOR

CROSS REFERENCE TO RELATED APPLICATION

The present application is based on and claims the benefit of priority of Japanese Patent Application No. 2019-022646, filed on Feb. 12, 2019, the disclosure of which is incorporated herein by reference.

TECHNICAL FIELD

The present disclosure generally relates to an ultrasonic distance detector.

BACKGROUND INFORMATION

As an ultrasonic distance detection device, for example, there is an ultrasonic liquid level detection device. In such a device, an ultrasonic sensor utilizing a piezo effect is disposed in a liquid (e.g., a fuel/gasoline), and an ultrasonic wave is output toward a liquid surface, and a reflected wave is received by the same ultrasonic sensor to detect a distance thereto. The liquid level detection device detects an amount of liquid stored inside a tank or the like by obtaining the distance to the liquid level.

In such case, since the signal of the reflected wave detected by the ultrasonic sensor is weak, it may sometimes be difficult to detect an accurate distance to the liquid level due to a noise overriding on the wiring from the ultrasonic sensor to a circuit that receives the signal.

SUMMARY

It is an object of the present disclosure to provide an ultrasonic distance detector that is capable of accurately detecting a distance by reducing a noise superimposed on the signal line.

In accordance with the disclosure, transmission signals are output from the drive circuit to the two signal lines via the impedance matching circuit, transmission and reception signals on the two signal lines become complementary level signals. Further, when noise signals of the same phase are superimposed on the two signal lines, the transmission and reception signals can be taken in by the receiver circuit with the same phase noise cancelled therefrom. As a result, it is possible to take in the transmission signal and reception signal to accurately detect the distance based on a time difference between the two signals.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Hereinafter, the first embodiment of the present disclosure is described with reference to FIGS. 1 and 2. In the present embodiment, as an ultrasonic distance detector using an ultrasonic sensor 1, a liquid level detector 2 provided in a fuel tank of a vehicle is described as an example. A configuration for detecting a liquid level position of the fuel in the fuel tank is that the ultrasonic sensor 1 outputs (e.g., irradiates) an ultrasonic wave from a bottom portion in the fuel tank to the liquid level (i.e., a surface) of the fuel, and the reflected wave is detected by the ultrasonic sensor 1.

Figure 1:
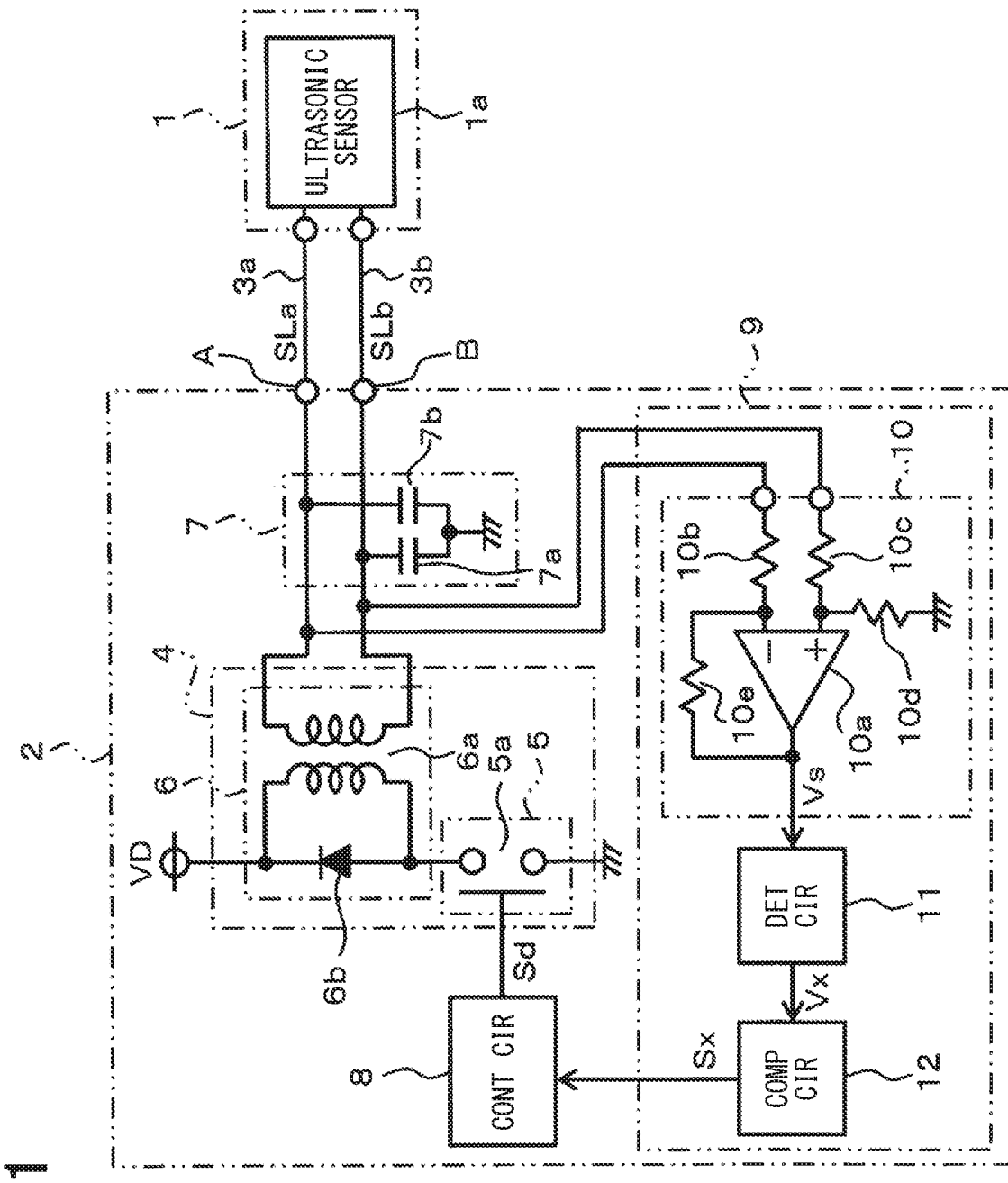
FIG. 1 is an electrical configuration diagram of a first embodiment.

In FIG. 1, the ultrasonic sensor 1 is one having a built-in sensor element 1a formed by laminating, for example, PZT (lead zirconate titanate) having a piezoelectric effect in a round disk shape, and the sensor 1 outputs ultrasonic waves upon having a drive signal applied to both of its terminals. Further, the ultrasonic sensor 1 generates a reception signal by receiving an ultrasonic wave reflected by the liquid surface. The ultrasonic sensor 1 exchanges drive signals and reception signals with the liquid level detector 2 via the two signal lines 3a and 3b. The two signal lines 3a and 3b can be a twist line or a two-wire shield line.

A transmitter circuit 4 includes a drive circuit 5 and an impedance matching circuit 6. The impedance matching circuit 6 and the drive circuit 5 are connected in series at a position between a direct current (DC) power source VD and a ground. The drive circuit 5 includes a switch 5a such as a semiconductor switching element or other switching element. The impedance matching circuit 6 includes a pulse transformer 6a and a diode 6b. The diode 6b is connected to a primary coil of the pulse transformer 6a. A secondary side (i.e., two ends) of the pulse transformer 6a are connected to the two signal lines 3a and 3b via input and output terminals A and B, respectively.

A Y capacitor 7 is connected to the two signal lines 3a and 3b as a common mode noise filter. The Y capacitor 7 has one end of each of the two capacitors 7a and 7b connected to the signal lines 3a and 3b, and the other end connected to the ground. The Y capacitor 7 reduces common mode noise superimposed on the two signal lines 3a and 3b.

A control circuit 8 includes a logic circuit or a microcomputer, and outputs a drive signal Sd for driving the switch 5a of the drive circuit 5 on and off. The control circuit 8 also has a function as a detection circuit as described later.

The receiver circuit 9 includes a differential amplifier circuit 10, a detector circuit 11, and a comparator circuit 12. The differential amplifier circuit 10 is configured to have a differential amplifier 10a as its main component. An inverting input terminal of the differential amplifier 10a is connected to the input/output terminal A via a resistor 10b, and a non-inverting input terminal thereof is connected to the input/output terminal B via a resistor 10c. The non-inverting input terminal of the differential amplifier 10a is connected to the ground via a resistor 10d. A resistor 10e is connected to a position between the inverting input terminal and the output terminal of the differential amplifier 10a.

The differential amplifier circuit 10 amplifies a difference between the signals respectively input to the inverting input terminal and the non-inverting input terminal, and outputs a result of amplification as an amplified signal Vs, thereby interrupting or cancelling noise components or the like that have been superimposed on the two signal lines 3a and 3b.

When the amplified signal Vs from the differential amplifier circuit 10 is input, the detector circuit 11 detects the input by envelope detection, and outputs it as a detector signal Vx. When the detector signal Vx from the detector circuit 11 is input, the comparator circuit 12 compares the input with a threshold voltage Vth, and outputs a comparison output Sx to the control circuit 8. In such case, the comparator circuit 12 generates the comparison output Sx as a high level signal when the detector signal Vx exceeds the threshold voltage Vth.

Figure 2:
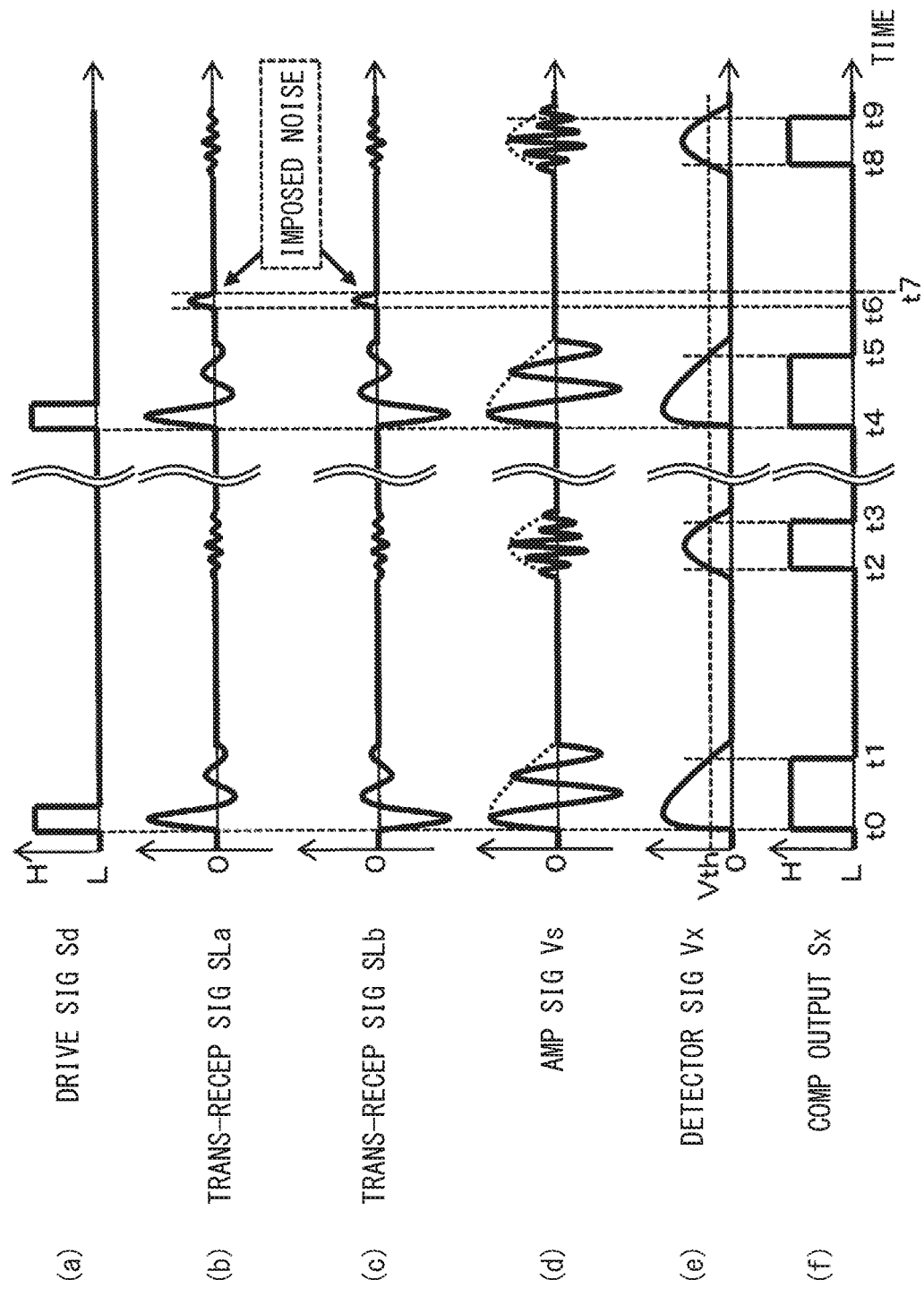
FIG. 2 is a time chart.

Next, operation of the above-mentioned configuration is described also with reference to FIG. 2. FIG. 2 row (a) shows the drive signal Sd output from the control circuit 8. When the drive signal Sd is output from the control circuit 8 at time t0, the switch 5a of the drive circuit 5 is turned on. As a result, transmission signals SLa and SLb are output to the two signal lines 3a and 3b via the impedance matching circuit 6 during an on period of the switch 5a. The transmission signals SLa and SLb are output as complementary signals between the signal lines 3a and 3b as shown in FIG. 2 rows (b) and (c).

The transmission signals SLa and SLb are output toward an object (i.e., a detection target) as ultrasonic waves by the sensor element 1a in the ultrasonic sensor 1. On the other hand, the transmission signals SLa and SLb are also input to the receiver circuit 9. In the receiver circuit 9, the differential amplifier circuit 10 amplifies the input signal as a signal corresponding to a difference between the transmission signals SLa and SLb, and outputs the amplified signal Vs as shown in FIG. 2 row (d).

The detector circuit 11 envelope-detects the amplified signal Vs input from the differential amplifier circuit 10, and outputs it as a positive half-wave detector signal Vx as shown in FIG. 2 row (e). In the comparator circuit 12, as shown in FIG. 2 row (f), when the level of the detector signal Vx input from the detector circuit 11 exceeds the threshold voltage Vth, it is output as the comparison output Sx which is in high level.

In row (f) of FIG. 2, the comparator circuit 12 outputs the comparison output Sx to the control circuit 8 as a signal that has a high level during a period from time t0 to time t1. The control circuit 8 detects a time from a rise timing t0 of the comparison output Sx input from the comparator circuit 12 considering it as a reference to an input timing of the comparison output Sx corresponding to the reception signal.

When the ultrasonic wave output from the ultrasonic sensor 1 according to the transmission signals SLa and SLb described above is reflected by the liquid surface which is the detection target, the ultrasonic wave returns to the ultrasonic sensor 1 and is converted to an electric signal as shown in FIG. 2 row (b), to be transmitted as the reception signals SLa and SLb and output to the two signal lines 3a and 3b.

The reception signals SLa and SLb are similarly input to the receiver circuit 9, converted into an amplified signal Vs by the differential amplifier circuit 10 in the same manner as described above, and can be obtained as a comparison output Sx through the detector circuit 11 and the comparator circuit 12. In such case, the comparison output Sx of the reception signal is input to the control circuit 8 as a signal that rises at time t2 and falls at time t3, as shown in FIG. 2 row (f).

In the control circuit 8, an elapsed time T ($=t2-t0$) between rising timings t0 and t2 of the comparison output Sx between the transmission signal and the reception signal is calculable, which is a "flight time" of an ultrasonic wave that is emitted from the ultrasonic sensor 1 to return thereto after the reflection on the liquid surface, thereby enabling detection of the distance to the position of the liquid level, and enabling detection of an amount of residue fuel in the fuel tank.

In such a detection operation, a noise signal Sn may be superimposed on the two signal lines 3a and 3b from the outside. In such case, when the level of the noise signal is equal to or higher than the level of the reception signals SLa and SLb from the ultrasonic sensor 1, the reception signals SLa and SLb are difficult to be distinguished from the noise signal Sn, and there may be a risk of false detection.

On the other hand, in the present embodiment, since the transmission signals SLa and SLb are transmitted through the impedance matching circuit 6, the levels of the signals transmitted through the two signal lines 3a and 3b change to have complementary signal levels. Similarly, since the levels of the reception signals SLa and SLb also change in a complementary manner, the receiver circuit 9 receives, i.e., obtains, such a signal as an amplified signal Vs with an amplified signal level corresponding to a two-fold difference, i.e., a difference of the two reception signals doubled by the differential amplifier circuit 10.

On the other hand, although the levels of the noise signal Sn superimposed on the two signal lines 3a and 3b are also substantially the same, the noise signal Sn is equally superimposed from the outside to become an in-phase (i.e., same phase) signal. Therefore, the in-phase noise signal Sn is attenuated by the Y capacitor 7 and is canceled by taking a difference in the differential amplifier circuit 10 of the receiver circuit 9.

As shown in FIG. 2 row (a), a case where the drive signal Sd is output at time t4 is described in the same manner as described above. The transmission signals SLa and SLb as shown in FIG. 2 row (b) and row (c) are output from the transmitter circuit 4 to the two signal lines 3a and 3b according to the drive signal Sd. Thereafter, at time t6 before the reception signals SLa and SLb return, as shown in FIG. 2 row (b) and row (c), it is assumed that the noise signal Sn is superimposed on the signal lines 3a and 3b.

In such case, since the noise signal Sn is generally superimposed on the signal lines 3a and 3b in the same phase, the noise signal Sn is canceled by taking a difference in the differential amplifier circuit 10 of the receiver circuit 9, thereby the amplified signal Vs can be taken in as a signal on which the noise signal Sn is not superimposed. As a result, the noise signal Sn is removed from the comparison output Sx, and high-level signals corresponding to the reception signals SLa and SLb can be detected at time t8.

According to the first embodiment, the following effects are achievable. That is, in the first embodiment, the output signal of the drive circuit 5 is output to the two signal lines 3a and 3b via the impedance matching circuit 6, and the differential amplifier circuit 10 of the receiver circuit 9 differentially amplifies the signal for detection. As a result, even when the in-phase noise signal Sn is superimposed on the signal lines 3a and 3b, the noise signal Sn can be removed and the distance to the liquid surface can be accurately detected based on the reception signal.

Further, in the first embodiment, since the Y capacitor 7 is connected to a position between the two signal lines 3a and 3b, the noise signal Sn can be attenuated also by such configuration. Note that, although the in-phase noise signal Sn can be cut off in principle by the differential amplifier circuit 10, the level of the noise signal Sn may be not equal to each other on the two signal lines due to a shift of the circuit constant or the like. That is, the Y capacitor 7 functions as an effective noise-reduction configuration in the practical circuit.

In other words, the Y capacitor 7 may be omitted if the noise signal Sn can be sufficiently cancellable by the differential amplifier circuit 10 when there is no shift or deviation of the circuit constant.

Further, when a twist line or a two-wire shielded line is used as the two signal lines 3a and 3b, it is much more difficult to superimpose the noise signal Sn from the outside, which means that the noise reduction effect can be further enhanced.

Second Embodiment

Figure 3:
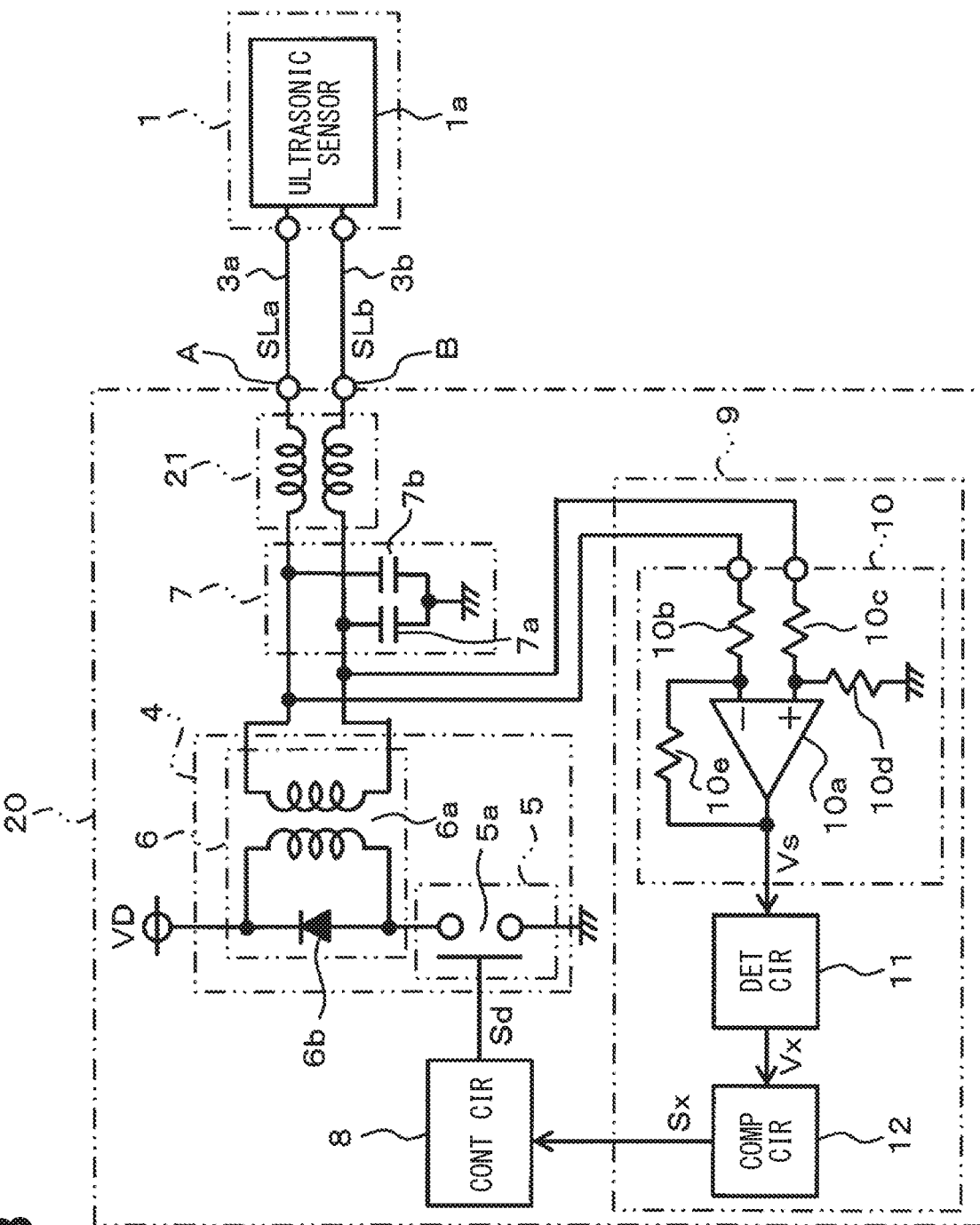
FIG. 3 is an electrical configuration diagram of a second embodiment.

FIG. 3 shows the second embodiment, about which the differences from the first embodiment is described in the following. In the present embodiment, in addition to the configuration of the first embodiment, a common mode noise filter is additionally provided. That is, as shown in FIG. 3, a liquid level detector 20 is configured to have a common mode choke coil 21 interposed at a position between the impedance matching circuit 6 and the terminals A and B.

In such manner, the effects of reducing the noise signal Sn superimposed on the two signal lines 3a and 3b are exertable by both of the common mode choke coil 21 and the Y capacitor 7, further enhancing the noise reduction effects, and the signal detection operation can be more accurately performable. Therefore, according to the second embodiment, the same effects as that of the first embodiment are achievable, and, in addition, the noise reduction effects can be further enhanced.

In the second embodiment, the Y capacitor 7 and the common mode choke coil 21 are both provided as a common mode noise filter. However, the common mode choke coil 21 may only be provided without providing the Y capacitor 7.

Other Embodiments

The present disclosure should not be limited to the embodiments described above, and various embodiments may further be implementable without departing from the scope of the present disclosure, which may be exemplified as a modification described below.

Although, in the above-mentioned embodiments, an example of using the present disclosure in a liquid level detector is shown, the present disclosure may be applicable not only to an in-liquid device, but also to a device for use in the air, i.e., a distance detection device of using the transmission and reception ultrasonic wave in the air. The impedance matching circuit is not limited to the one using a transformer, but may also be other impedance matching circuits.

In the above embodiments, although the differential amplifier circuit 10 is provided as a means for cutting the in-phase noise signal Sn in the receiver circuit, it may also be possible to provide other circuits in the receiver circuit for cutting the in-phase noise signal. Further, about the differential amplifier circuit 10 shown in the above embodiments, other, arbitrary circuit configuration may also be adoptable, as long as such configuration has a function of a differential amplification.

Although the present disclosure has been described in accordance with the embodiments, it is understood that the present disclosure is not limited to such examples or embodiment structures. The present disclosure encompasses various modifications and variations within the scope of equivalents. In addition, various combinations and forms, with an addition/subtraction of an element or elements added/subtracted thereto/from, may be encompassed within the scope of the present disclosure.

What is claimed is:

1. An ultrasonic distance detector for detecting a distance from an ultrasonic sensor to a target object, the ultrasonic distance detector comprising:
    a drive circuit including a drive switch configured to drive an impedance matching circuit;
    the impedance matching circuit, including a diode and a pulse transformer, wherein the pulse transformer includes a drive coil and an output coil, and wherein the diode and the drive coil are in parallel;
    a first terminal connected to an upper end of the output coil, and configured to: (i) output a first transmitted signal; and (ii) input a first received signal;
    a second terminal connected to a lower end of the output coil, and configured to: (i) output a second transmitted signal, and (ii) input a second received signal;
    a receiver circuit including:
        (i) a differential amplifier circuit,
        (ii) a detector circuit, and
        (iii) a comparator circuit; and
    a control circuit configured to:
        (i) receive a comparison output from the comparator circuit, and
        (ii) send a drive signal to control the drive circuit,
    wherein the differential amplifier circuit is configured to generate an amplified signal by differentially amplifying signals from the first terminal and the second terminal,
    wherein the detector circuit is configured to receive the amplified signal, and to generate a detector signal based on envelope detection,
    wherein the comparator circuit is configured to:
        (i) receive the detector signal,
        (ii) compare the detector signal against a threshold voltage, and
        (iii) output a comparison output having a first value when the detector signal is greater than the threshold voltage, and having a second value when the detector signal is less than the threshold voltage,
    wherein the control circuit is configured to detect a distance between the ultrasonic sensor and the target object based on an elapsed time between: (i) a start of a first pulse from the comparison output associated with the transmitted signals, and (ii) a start of a second pulse associated with the received signals.

2. The ultrasonic distance detector of claim 1, wherein an upper end of the diode is connected to a driving voltage.

3. The ultrasonic distance detector of claim 1, wherein the drive circuit is connected to a ground.

4. The ultrasonic distance detector of claim 1 further comprising:
    a common mode noise filter connected to the terminals.

5. The ultrasonic distance detector of claim 1, wherein the terminals are connected to the ultrasonic sensor using a twist line or a two-wire shielded line.

6. The ultrasonic detector of claim 1, further comprising:
    common mode choke coils including a first choke coil and a second choke coil,
    wherein the first choke coil electrically connects the upper end of the output coil and the first terminal, and
    wherein the second choke coil electrically connects the lower end of the output coil and the second terminal.

* * * * *